United States Patent [19]

Pearce et al.

[11] Patent Number: 5,617,572
[45] Date of Patent: Apr. 1, 1997

[54] SYSTEM FOR REDUCING POWER CONSUMPTION IN COMPUTERS

[75] Inventors: John J. Pearce, Del Valle; Jim Walker, Cedar Park; Charles P. Zeller; Craig S. Jones, both of Austin, all of Tex.

[73] Assignee: Dell USA, L.P., Austin, Tex.

[21] Appl. No.: 666,059

[22] Filed: Jun. 19, 1996

Related U.S. Application Data

[63] Continuation of Ser. No. 381,058, Jan. 31, 1995, abandoned.

[51] Int. Cl.$^6$ .............................. G06F 1/32; G06F 11/30
[52] U.S. Cl. ............................................................ 395/750
[58] Field of Search ..................... 395/750, 800; 364/707

[56] References Cited

U.S. PATENT DOCUMENTS

| | | | |
|---|---|---|---|
| 4,260,947 | 4/1981 | Massey | 323/322 |
| 5,201,059 | 4/1993 | Nguyen | 395/800 |
| 5,345,564 | 9/1994 | Jensen et al. | 395/750 |
| 5,349,688 | 9/1994 | Nguyen | 395/800 |
| 5,355,501 | 10/1994 | Gross et al. | 395/750 |
| 5,392,437 | 2/1995 | Matter et al. | 395/750 |
| 5,396,635 | 3/1995 | Fung | 395/800 |
| 5,404,543 | 4/1995 | Fancher et al. | 395/750 |
| 5,404,546 | 4/1995 | Stewart | 395/750 |
| 5,408,639 | 4/1995 | Gulick et al. | 395/750 |
| 5,408,668 | 4/1995 | Tornai | 395/750 |
| 5,486,726 | 1/1996 | Kim et al. | 395/750 |

*Primary Examiner*—Ayaz R. Sheikh
*Attorney, Agent, or Firm*—Haynes and Boone, L.L.P.

[57] ABSTRACT

A system for reducing the amount of power consumed by a battery operated computer device is disclosed. A microcontroller continuously monitors the activity of at least one I/O device and sets an activity state variable (ASV) associated with the I/O device accordingly. Upon each the expiration of a preselected time period, the microcontroller examines the state of the ASV to determine whether the I/O device was active during the expired time period. If so, the I/O device is caused to operate in a full power mode; otherwise, the I/O device is caused to operate in a reduced power consumption mode. In one embodiment, the I/O device is capable of operating in more than one reduced power consumption mode, in which case, responsive to a determination that the I/O device was not active during the expired time period, the I/O device is caused to operate in the next lowest power consumption mode. In an alternative embodiment, the frequency with which timer interrupts are generated is automatically adjusted after the expiration of each time period.

35 Claims, 6 Drawing Sheets

SYSTEM FOR REDUCING POWER CONSUMPTION IN COMPUTERS

This is a continuation of application Ser. No. 08/381,058 filed on Jan. 31, 1995, now abandoned.

TECHNICAL FIELD

The invention relates generally to battery operated devices and, more particularly, to a system for reducing power consumption in such devices.

BACKGROUND OF THE INVENTION

Portable personal computers (PCs) were first introduced in the early 1980s and have since enjoyed great commercial success and consumer acceptance. As the portable PC market has grown, users have begun to demand lighter weight, lower volume PCs which can be used for longer periods of time between battery charges. Meeting these demands has proved challenging in view of the fact that most portable PCs now support peripheral devices previously available only on desktop PCs. The additional peripherals greatly increase overall power consumption, making it difficult to achieve an optimal level of functionality while maintaining an acceptable battery life. Furthermore, although for reasons other than maximizing battery life, it has become desirable to more efficiently manage power consumption of desktop PCs in order to minimize overall operating costs.

Because many of the components and peripheral devices of both desktop and portable PCs consume a great deal of power even when they are not active, power management systems have been developed which cause each component or peripheral device to operate in the lowest power consumption mode with respect to present demands on the system. For example, U.S. Pat. No. 4,980,836 to Carter et al. discloses a power management system for a portable PC system in which the hard disk unit, the floppy disk unit, the keyboard, the serial ports and the printer are monitored for I/O activity to determine whether the system is active and a timer is reset upon each access to any of the monitored devices. If the timer counts down to zero, the system is deemed inactive and is placed in a reduced power consumption mode, in which power is removed from the hard disk unit, the floppy disk unit, the LCD and miscellaneous circuitry and clocks. To bring the system out of the reduced power consumption mode, a user depresses a switch to initiate a wakeup operation.

Since Carter, improvements in the basic power management system have been introduced which include options such as blanking the liquid crystal display (LCD) or monitor screen after a preselected period of I/O inactivity or turning off the hard disk drive motor after the hard disk drive has not been accessed for a preselected period of time. Furthermore, there may be provided more than one reduced power consumption mode. For example, there may be a "STANDBY" mode, in which certain components, such as the LCD and the hard disk drive motor, are caused to enter a reduced power consumption mode but the processing speed of the central processing unit (CPU) is not affected, and a "SLEEP" mode, in which nearly all of the functions of the PC are slowed or halted, including the CPU. From the standpoint of power consumption, the SLEEP mode is substantially equivalent to turning the PC off, except that no data is lost.

It may be desirable in many cases to monitor each of a selected group of PC components and cause that component to operate in a reduced power consumption mode if it has not been accessed during a preselected time period. Therefore, what is needed is a system for efficiently monitoring each of a plurality of PC I/O and peripheral devices individually and causing the device to operate in one or more reduced power consumption modes, depending on the type of device, if it is determined that the device has not been accessed during a preselected time period.

SUMMARY OF THE INVENTION

The foregoing problems are solved and a technical advance is achieved by method and apparatus for reducing power consumption in battery operated devices, namely, PCs. In a departure from the art, a power management system of the present invention individually monitors each of several I/O and peripheral devices of a PC for activity during a predefined activity period, as delimited by a periodic timer associated with the device. Upon the expiration of the associated timer, a determination is made whether the device was active during the expired activity period. If so, the device is caused to continue to operate in a full power mode; otherwise, it is caused to operate in its next lowest reduced power consumption mode.

In a preferred embodiment, a PC embodying features of the present invention comprises a power management microcontroller electrically connected via a system bus to at least one I/O, or peripheral, device to be power managed. Also connected to the microcontroller and the I/O device is an I/O activity interrupt generator for monitoring the system bus for I/O device activity and generating an I/O interrupt to the microcontroller upon detection of same. The power management microcontroller includes a power management unit (PMU), comprising appropriate hardware and/or software for implementing the power management functions of the present invention, registers or memory devices for storing an activity state variable (ASV) and a power state variable (PSV), respectively, for each I/O device to be power managed by the PMU, and a periodic timer associated with each I/O device to be power managed by the PMU, it being understood that the periodic timers may be implemented using hardware timers or a combination of hardware and software for generating periodic timer interrupts. The microcontroller controls the power consumption mode of each I/O device (i.e., ON/FULL POWER, STANDBY, SUSPEND, OFF) in accordance with the current state of its ASV and PSV as follows.

In general, an ASV has two states, which are IDLE and BUSY. A PSV has two or more states, depending on the type of I/O device with which it is associated and the number of reduced power consumption modes in which the device is operable. With respect to a particular I/O device, when the PC is first turned on, its ASV is set to IDLE, to indicate there has been no I/O activity, its PSV is set to 0, corresponding to an ON, or FULL POWER, mode of the I/O device, and the I/O device is caused to operate in FULL POWER mode. At this point, the periodic timer associated with the I/O device also starts to run. As previously indicated, the I/O activity interrupt generator monitors the system bus for I/O device activity and, upon detecting that an I/O device is active, the interrupt generator generates an I/O activity interrupt to the microcontroller. In addition, the interrupt generator sets an internal flag associated with the active I/O device such that subsequent activity of the I/O device does not result in the generation of an interrupt. Upon the receipt by the microcontroller of an I/O activity interrupt, the ASV is set to BUSY, to indicate the occurrence of I/O activity.

Upon the expiration of the associated timer, as indicated by the generation of a periodic timer interrupt to the microcontroller, the state of the ASV is checked. If the ASV is set to BUSY, indicating that I/O activity occurred during the previous period, the device remains in FULL POWER mode, as it is apparently active. Alternatively, if the ASV is set to IDLE, indicating that there was no I/O activity during the period, the PSV is checked to determine the mode of operation of the device and, if the device is not already in its lowest reduced power mode, the PSV is incremented and the device is caused to operate in its next lowest reduced power consumption mode, as indicated by the incremented value of the PSV. In addition, regardless of the states of the ASV and PSV, the internal flag of the interrupt generator associated with the I/O device is reset.

In an alternative embodiment, in which the power management microcontroller is used to power manage multiple I/O devices, for example, DEVICE1 and DEVICE2, the microcontroller includes, in addition to the PMU, two ASV registers, designated ASV1 and ASV2, and two PSV registers, designated PSV1 and PSV2, respectively corresponding to DEVICE1 and DEVICE2. In addition, the timer is implemented using a read/write countdown register loaded with a variable TIMER, the value of which controls the period of the timer for generating interrupts. In this embodiment, ASV1 and ASV2 are initiated to 0 (IDLE) and PSV1 and PSV2 are initialized to 0 on power up of the PC. Upon each detection of an I/O activity interrupt, the ASV and PSV of the corresponding device are set to the current value of TIMER and 0, respectively, and the device is caused to operate in a full power mode, it being noted that the I/O interrupt generator is at no time disabled in this alternative embodiment. Upon each detection of a timer interrupt, execution proceeds as described above, except that the value of TIMER is adjusted by subtracting the greater of the value of ASV 1 and ASV2 from TIMER.

A technical advantage achieved with the invention is that each of several I/O and peripheral devices of a PC can be monitored individually and caused to operate in successive reduced power consumption modes in an orderly fashion, thereby reducing the overall power consumption of the PC.

A further technical advantage achieved with the invention is that each device is systematically cycled through its reduced power consumption modes until it has been placed in the lowest such mode, typically "OFF," or accessed.

Another technical advantage achieved with the invention is that, using the alternative embodiment, the time lag inherent in the use of a static time period may be significantly reduced or eliminated.

DETAILED DESCRIPTION OF THE PREFERRED EMBODIMENT

Figure 1A:
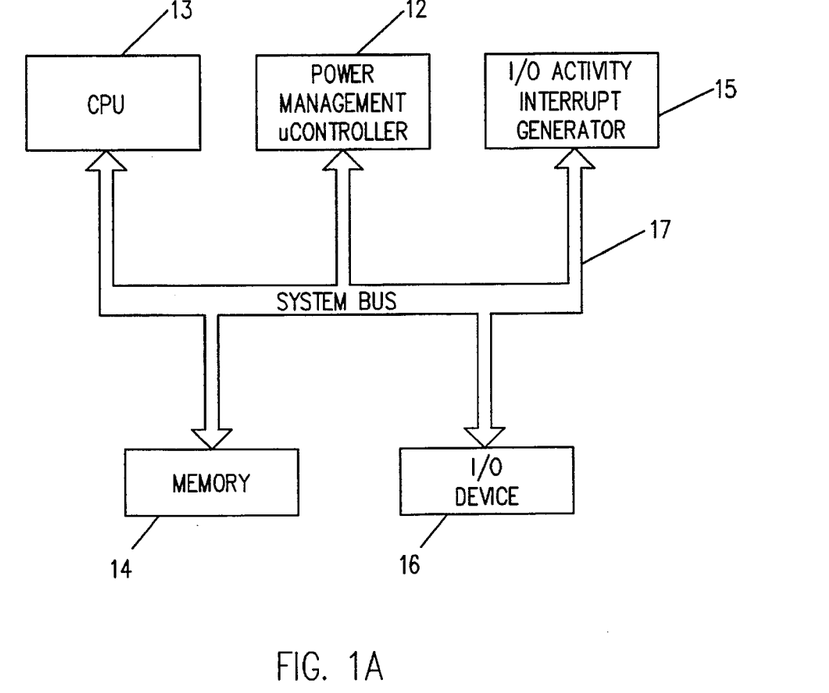
FIG. 1A is a block diagram of a PC for implementing a power management system embodying features of the present invention.

In FIG. 1A, a PC including a power management system embodying features of the present invention is designated by reference numeral 10. The PC 10 comprises a power management microcontroller 12, a CPU 13, memory 14, an I/O activity interrupt generator 15, and at least one I/O device 16 all electrically interconnected in a conventional manner via a system bus 17.

Figure 1B:
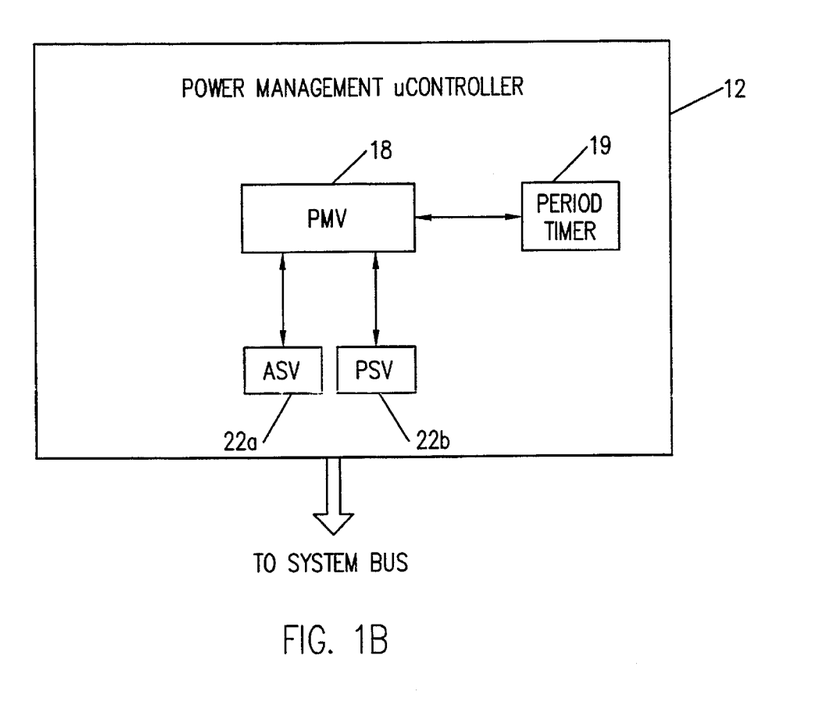
FIG. 1B is a block diagram of the power management microcontroller of FIG. 1A.

Referring to FIG. 1B, the power management microcontroller 12 is illustrated in greater detail. As illustrated, the microcontroller 12 includes a power management unit (PMU) 18, comprising appropriate hardware (including memory) and/or software for implementing the power management functions of the present invention, as will be described. Connected to the PMU 18 are a periodic timer 19 associated with the I/O device 16 for generating to the PMU 18 a timer interrupt at periodic intervals, and registers or other appropriate storage devices 22a, 22b, for storing an activity state variable (ASV) and a power state variable (PSV), respectively, or indicating the activity and power states of the I/O device 16. In a particular embodiment, the timer 19 is implemented by programming a hardware register, typically a countdown register, to generate a periodic interrupt at a desired frequency, although it should be understood that the timer 19 may be implemented using hardware or a combination of hardware and software for generating periodic timer interrupts. As will be described in greater detail with reference to FIGS. 2 and 3, the microcontroller 12 controls the power consumption mode of the I/O device 16 (i.e., FULL POWER, STANDBY, SUSPEND, OFF) in accordance with the current state of the ASV and the PSV stored in the registers 22a, 22b.

It should be understood that, although not shown, the PC 10 may include any number of I/O devices, such as the I/O device 16, to be power managed. Accordingly, for each such I/O device, the PC 10 will include an associated timer, such as timer 19, and ASV and PSV registers, such as the registers 22a, 22b, corresponding to the state and power consumption mode of the managed I/O device. Alternatively, the PC 10 may include a single timer and a single set of ASV and PSV registers 22a, 22b, for the entire system, in which case all of the I/O devices will be power managed simultaneously.

In general, the ASV has two states, which are IDLE and BUSY, while the PSV has two or more states, depending on the type of I/O device 16 and the number of reduced power consumption modes in which the device is operable. For example, a particular type of display device may have n power consumption modes, where n is greater than two (2), as shown in Table I below:

TABLE I

| PSV Value | Device Power Mode |
| --- | --- |
| 0 | ON/FULL POWER |
| 1 | STANDBY |
| 2 | SUSPEND |
| n | OFF |

In a preferred embodiment, as shown in Table I, the Device Power Modes are arranged in order of decreasing power consumption and in an inverse relationship with the value of the PSV, such that as the value of the PSV increases, the power consumption mode of the device decreases.

Alternatively, the I/O device 12 may be a hard disk drive having only two power modes, as shown below in Table II:

TABLE II

| PSV Value | Device Power Mode |
| --- | --- |
| 0 | ON/FULL POWER |
| 1 | OFF |

Although described with greater specificity below with reference to FIGS. 2 and 3, the overall operation of the power management functions of the system 10 may be generally described as follows. At the outset, it should be observed that, although the operation of the power management system will be described with respect to a single I/O device, i.e., the I/O device 16, the below described functions may occur with respect to each I/O device to be power managed. Accordingly, when the PC 10 is first turned on, the ASV in the register 22a is set to IDLE, to indicate there has been no I/O activity, the PSV in the register 22b is set to 0, corresponding to an ON, or FULL POWER, mode of the I/O device 16, and the I/O device 16 is caused to operate in its FULL POWER mode. At this point, the periodic timer 19 also starts to run.

Responsive to the detection by the I/O activity interrupt generator 15 of I/O device 16 activity, the generator 15 generates an I/O activity interrupt to the microcontroller 12 and sets an internal flag associated with the I/O device 16. In accordance with a feature of the present invention, so long as the internal flag is set, the generator 15 will not generate an I/O activity interrupt responsive to detection of I/O device 16 activity. Responsive to detection by the PMU 18 of an I/O activity interrupt from the generator 15, the ASV is set to BUSY, to indicate the occurrence of I/O activity during the period, the PSV is set to 0 and the device is caused to operate in FULL POWER mode, corresponding to PSV= 0. Upon the expiration of the current period, as indicated by the timer's 19 generating a periodic timer interrupt to the PMU 18, the state of the ASV is checked. If the ASV is set to BUSY, indicating that I/O activity occurred during the previous period, the value of PSV and the power consumption mode of the device 16 remain unchanged and the ASV is set to IDLE. Alternatively, if the ASV is set to IDLE, indicating that there has been no I/O activity during the previous period, the PSV is checked to determine the power consumption mode of the device and, if the device is not already in its lowest reduced power consumption mode, (i.e., if the PSV is not set to its maximum value), the PSV is incremented and the device is caused to operate in its next lowest reduced power consumption mode, that is, the mode corresponding to the incremented value of the PSV.

Figure 2:
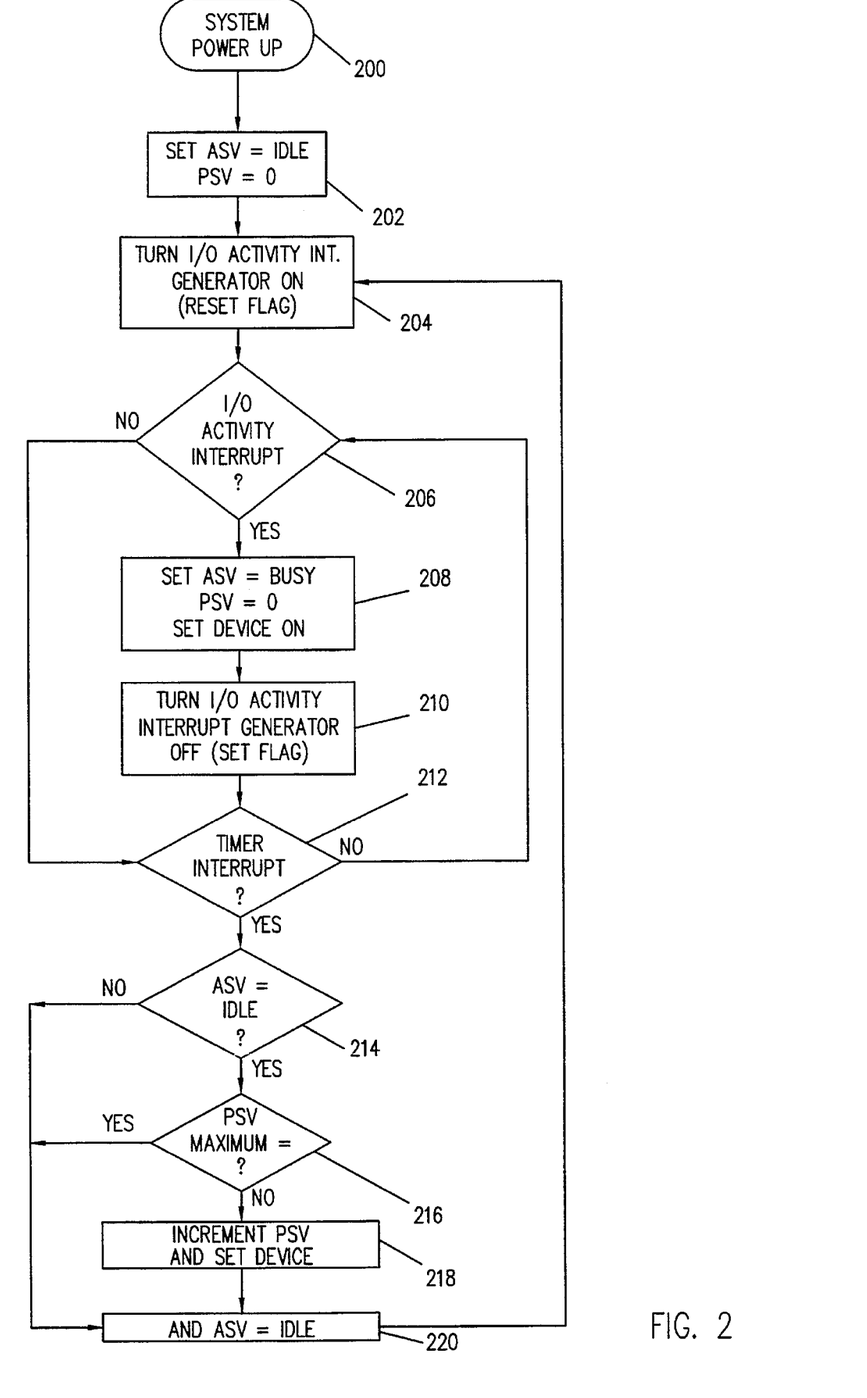
FIG. 2 is flowchart of the operation of the power management system of FIG. 1A.

Referring now to FIG. 2, the functions implemented by the microcontroller 12 and PMU 18 for power managing the device 16 will be described in greater detail. It should be understood that appropriate instructions for execution by the microcontroller 12 for implementing the below described functions are stored in a memory device (not shown) associated with or incorporated into the microcontroller 12. Execution begins in step 200 when the PC 10 is powered on by a user. In step 202, the ASV is set to IDLE and the PSV is set to 0. In step 204, the internal flag of the interrupt generator 15 is reset, to enable the generation of an I/O activity interrupt. In step 206, a determination is made whether an I/O activity interrupt has been detected by the PMU 18. If in step 206 it is determined that an I/O activity interrupt has been detected, execution proceeds to step 208, in which the ASV is set to BUSY and the PSV is set to 0. In addition, the device 16 is set to a power consumption mode associated with the value of the PSV, in this case, ON/FULL POWER. Execution then proceeds to step 210, in which the internal flag of the interrupt generator 15 is set, thereby disabling the generation of I/O activity interrupts responsive to subsequent I/O device 16 activity.

Execution then proceeds to step 212, in which a determination is made whether a timer interrupt has been received by the PMU 18. Moreover, if in step 206, it is determined that an I/O activity interrupt has not been received, execution proceeds directly to step 212. If in step 212 it is determined that a timer interrupt has not been received, execution returns to step 204; otherwise, execution proceeds to step 214. In step 214, a determination is made whether the ASV is set to IDLE. If it is determined that the ASV is set to IDLE, execution proceeds to step 216, in which a determination is made whether the PSV is set to its maximum value, which, as demonstrated above with reference to Tables I and II, will vary according to the number of power consumption modes in which the device 16 is operable. If it is determined that the PSV is not set to its maximum value, in step 218, the PSV is incremented by one (1) and the device 16 is caused to operate in the corresponding reduced power consumption mode.

It should be clear that the combination of steps 216 and 218 effect the following result: if the device 16 is not already in the lowest possible power consumption mode (step 216), the device 16 will be caused to operate in its next lowest possible power consumption mode (step 218). Execution then proceeds to step 220. If in step 214, it is determined that the ASV is not set to IDLE, or if in step 216, it is determined that the PSV is set to its maximum value, execution proceeds directly to step 220. In step 220, the ASV is reset to IDLE and execution returns to step 204.

Figure 3:
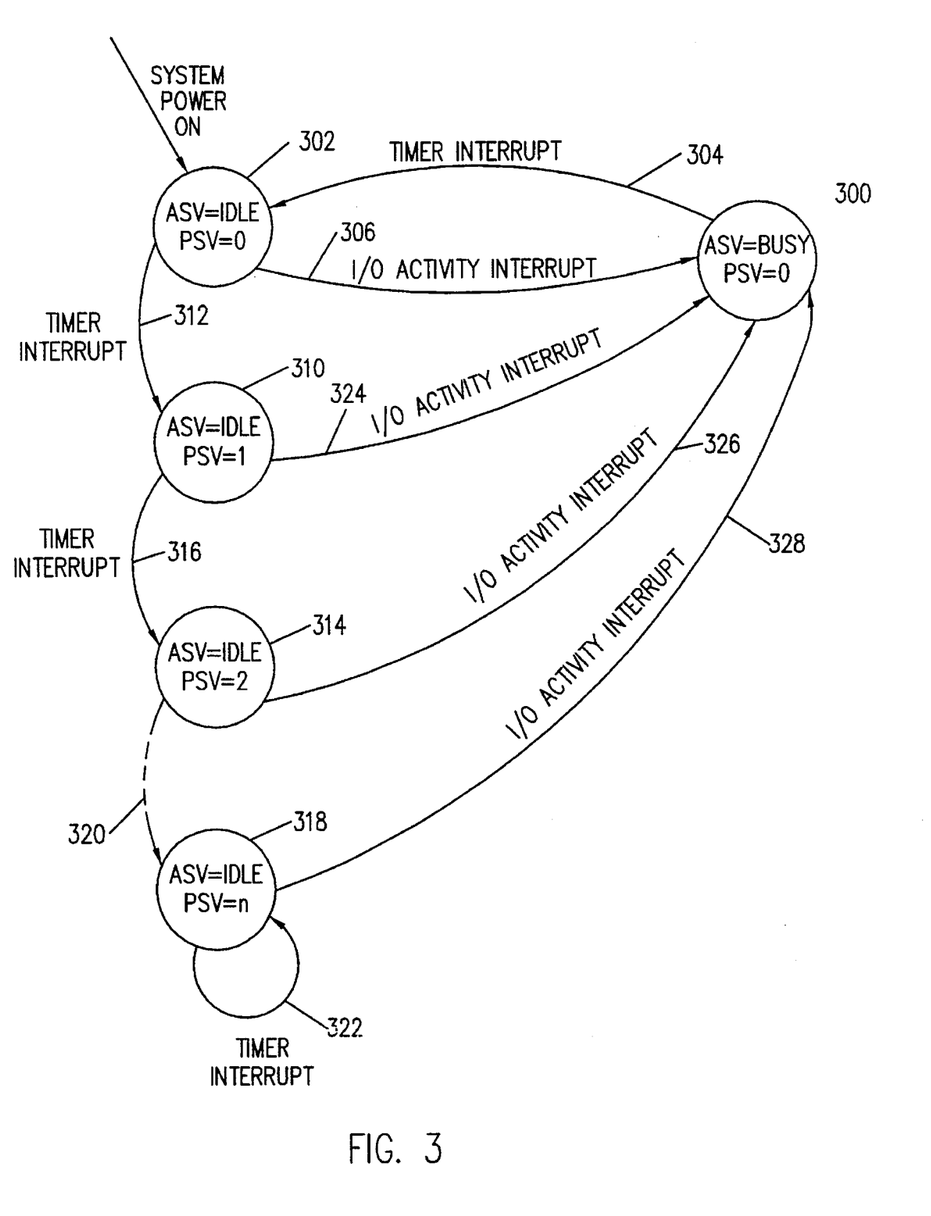
FIG. 3 is a state diagram of the power management system of FIG. 1A.

FIG. 3 shows a state diagram of the PC 10 during a power management operation in which the device 16 is operable in n reduced power consumption modes, wherein n is greater than two (2), as shown in Table I above. Referring to FIGS. 1 and 3, upon power up, the PC 10 is in a state 300, in which the ASV is set to IDLE, the PSV is set to 0, and the device 16 is ON (FIG. 2, steps 200, 202). Upon the detection by the microcontroller 12 of an I/O activity interrupt, the PC 10 transitions to a state 302, as indicated by a line 304, in which the ASV is set to BUSY, the PSV is set to 0, and the device 16 remains ON (FIG. 2, steps 206, 208). Upon the generation by the timer 19 of a periodic timer interrupt, while the PC 10 is in the state 304, the PC 10 transitions back to the state 302, as indicated by a line 308 (FIG. 2, steps 212, 214, 220).

Upon the generation by the timer 19 of a periodic timer interrupt while the PC 10 is in the state 302, the PC 10 transitions to a state 310, as indicated by the line 312, in which the ASV is set to IDLE, the PSV is set to 1, and the device 16 is caused by the microcontroller 12 to operate in its first reduced power consumption mode, for example, "STANDBY" (FIG. 2, steps 212–220). Upon the generation by the timer 19 of a periodic timer interrupt while the PC 10 is in the state 310, the PC 10 transitions to a state 314, as indicated by a line 316, in which the ASV is set to IDLE, the PSV is set to 2, and the device 16 is caused by the microcontroller 12 to operate its second reduced power consumption mode, for example, "SUSPEND" (FIG. 2, steps 212–220).

This process continues, with the PC transitioning to states corresponding to lower reduced power consumption modes responsive to upon the generation of a periodic timer interrupt, until the PC 10 transitions to a state 318, as indicated by a line 320, in which the ASV is set to IDLE, the PSV is set to n, and the device 16 is caused to operate in its lowest reduced power consumption mode, which is "OFF" (FIG. 2, steps 212–220). In the embodiment illustrated in FIG. 3 (and Table I), "n" is the maximum value for the PSV. Accordingly, upon the occurrence of subsequent periodic timer interrupts while the PC 10 is in the state 318, the PC 10 transitions back to the state 318, as indicated by the line 322 (FIG. 2, steps 212–216, 220).

It should be obvious from the above that, assuming the device 16 has n possible reduced power consumption modes (including OFF and excluding ON), upon each occurrence of a periodic timer interrupt while the ASV is set to IDLE, the PSV will incremented by one and the device 16 will caused by the microcontroller 12 to enter the next lowest possible power consumption mode until the PSV has been incremented to n and the device 16 has been caused to operate in its lowest reduced power consumption mode (typically OFF). At that point, the device 16 will continue to operate in this lowest power consumption mode until the generation by the device 16 of an I/O activity interrupt, as at which point, the device 16 is returned to its FULL POWER mode and the ASV and the PSV are set to BUSY and 0, respectively.

Referring again to FIG. 3, upon the generation by the device 16 of an I/O activity interrupt while the PC 10 is in one of the states 310, 314 or 318, the PC 10 transitions to the state 304, as shown by lines 324, 326 or 328, respectively (FIG. 2, steps 206, 208).

Figure 4:
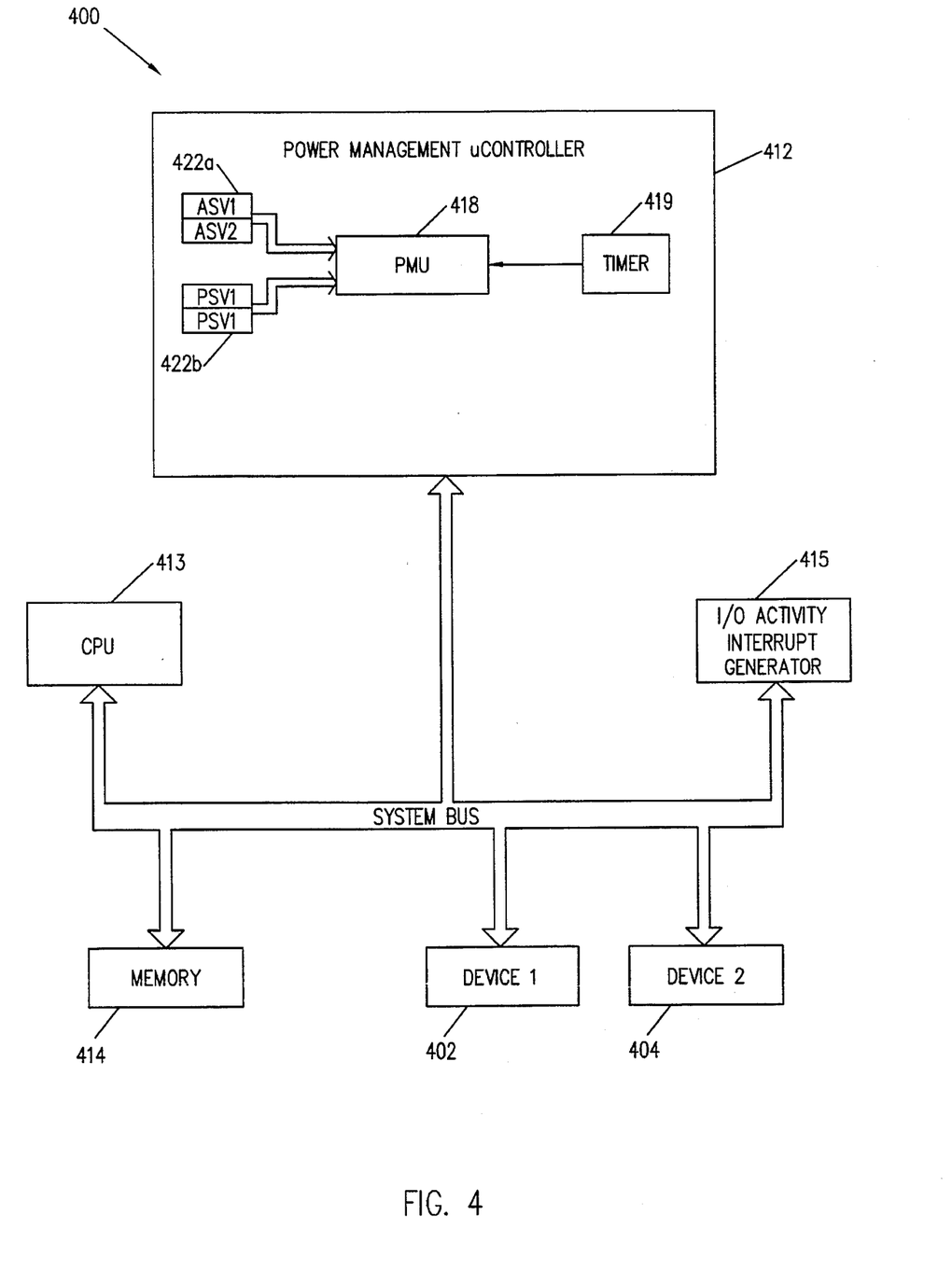
FIG. 4 is a block diagram of a PC for implementing an alternative embodiment of the power management system of the present invention.

Referring to FIG. 4, in an alternative embodiment of the present invention, the system is modified to advantageously power manage multiple I/O devices. As shown in FIG. 4, a PC 400 includes first and second I/O devices, respectively designated by reference numerals 402 and 404, respectively, interconnected with a power management microcontroller 412, CPU 413, memory 414, and an I/O activity interrupt generator 415 via a system bus 417. Similar to the power management microcontroller 12 (FIG. 1), the microcontroller 412 includes a PMU 418 and a timer 419. In addition, as described, but not shown, above in connection with FIGS. 1 and 2, the PMU 418 is connected to a set of ASV registers 422a and a set of PSV registers 422b for storing a respective ASV and PSV for each of the devices 402, 404. For purposes of clarity, the device 402 will be alternatively referred to herein as DEVICE1, with its corresponding ASV and PSV being designated ASV1 and PSV1. Similarly, the device 404 will be alternatively referred to herein as DEVICE2, with its corresponding ASV and PSV being designated ASV2 and PSV2.

In the preferred implementation of the embodiment shown in FIG. 4, the timer 419 comprises a programmable mad/write countdown register in which is stored a TIMER variable for controlling the frequency with which timer interrupts are generated by the timer 419. In addition, it should be recognized that the generator 415 generates individual I/O activity interrupts for each of the devices 402, 404, responsive to detection of activity thereof, respectively. As will be described, in this alternative embodiment, the generator 415 is not selectively enabled and disabled; rather, it remains in a constantly enabled state.

Figure 5A:
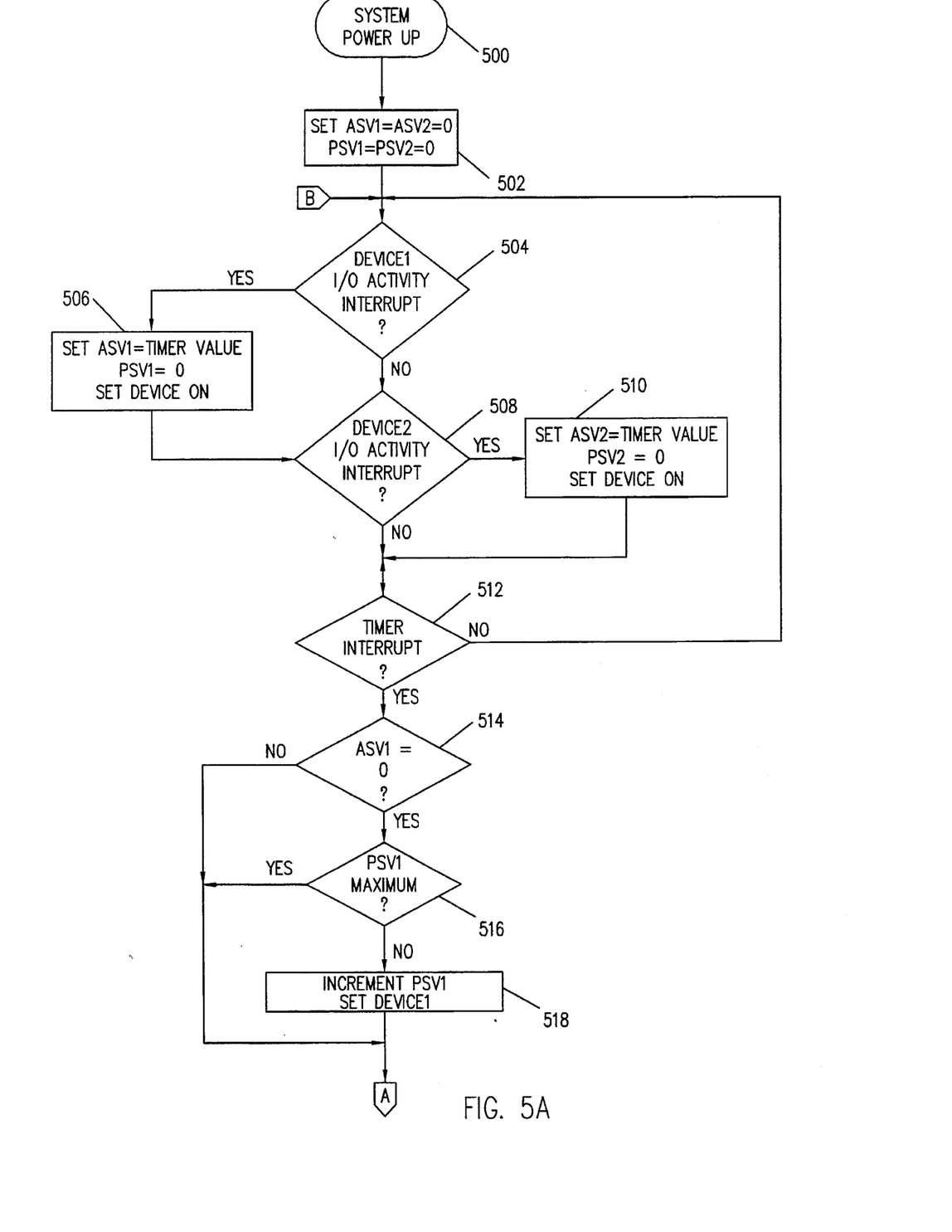
FIGS. 5A and 5B are a flowchart of the operation of the alternative embodiment of the power management system of FIG. 4.
Figure 5B:
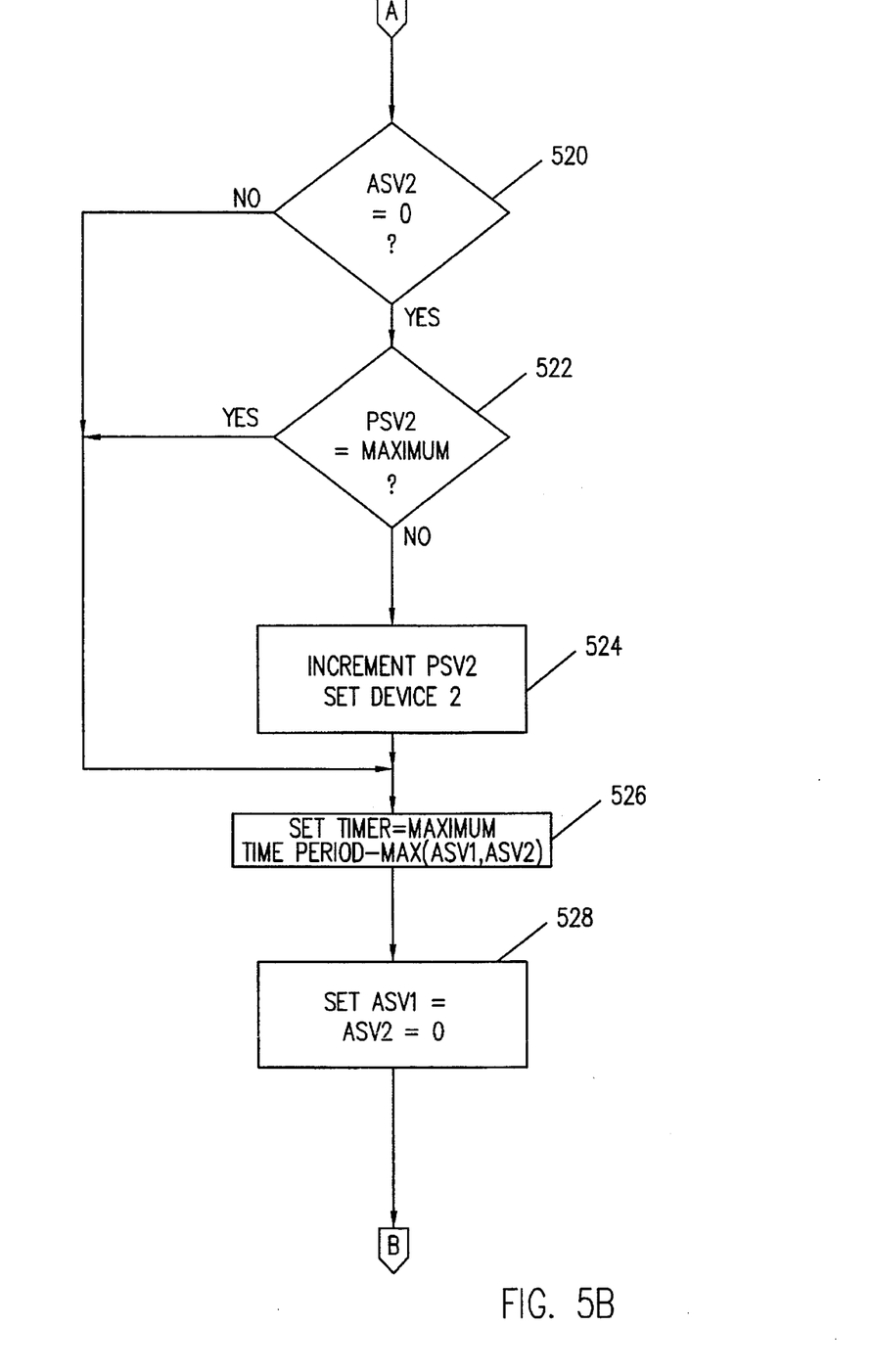

The operation of the alternative embodiment of the present invention will be described in greater detail with reference to FIGS. 5A and 5B. Execution begins in step 500 when the PC 400 is powered on by a user. In step 502, ASV1 and ASV2 are set to IDLE, which in this embodiment is represented by a logic 0, and PSV1 and PSV2 are also set to 0. In step 504, a determination is made whether the generator 415 has generated an I/O activity interrupt corresponding to DEVICE1 (hereinafter "DEVICE1 interrupt"). If so, execution proceeds to step 506, in which ASV 1 is set to the current value of TIMER, PSV1 is set to 0, and DEVICE1 is caused to operate in FULL POWER mode. Execution then proceeds to step 508. If in step 504, the generator 15 has not generated a DEVICE1 interrupt, execution proceeds directly to step 508. In step 508, a determination is made whether the generator 415 has generated an I/O activity interrupt corresponding to DEVICE2 (hereinafter "DEVICE2 interrupt"). If so, execution proceeds to step 510, in which ASV2 is set to the current value of TIMER, PSV2 is set to 0, and DEVICE2 is caused to operate in FULL POWER mode.

In step 512, a determination is made whether the timer 419 has generated a timer interrupt, which will occur when the timer 419 has counted down from the value of TIMER to zero. If not, execution returns to step 504; otherwise, execution proceeds to step 514. As previously indicated, the generator 415 is not disabled responsive to generation of an I/O activity interrupt; therefore, the values of ASV1 and ASV2 may be changed more than once before a timer interrupt is generated in step 512. In step 514, a determination is made whether ASV1 is set to 0 (IDLE). If so, execution proceeds to step 516, in which a determination is made whether PSV1 is set to its maximum value, as described above with reference to step 216 (FIG. 2). If not, execution proceeds to step 518. In step 518, PSV1 is incremented by 1 and DEVICE1 is caused to operate in the corresponding reduced power consumption mode as described above with reference to step 218 (FIG. 2).

Execution then proceeds to step 520. If in step 514, it is determined that ASV1 is not set to 0 (IDLE) or if in step 516, it is determined that PSV1 is set to its maximum value, execution proceeds directly to step 520. In step 520, a determination is made whether ASV2 is set to 0 (IDLE). If so, execution proceeds to step 522, in which a determination is made whether PSV2 is set to its maximum value. If not, execution proceeds to step 524, in which PSV2 is incremented by 1 and DEVICE2 is caused to operate in the corresponding reduced power consumption mode. Execution then proceeds to step 526. If in step 520 it is determined that ASV1 is not equal to 0 or if in step 522 it is determined that PSV2 is not set to its maximum value, execution proceeds directly to step 526. In step 526, the variable TIMER for controlling the period of the timer 419, is set to equal the maximum time period minus the greater of ASV1 and ASV2. It should be recognized that if both DEVICE1 and DEVICE2 were idle during the period (ASV1=ASV2= 0), the value of TIMER will be the maximum time period.

In this manner, the frequency with which timer interrupts are generated is appropriately dynamically adjusted according to the activity of the devices being managed. Accordingly, the time lag inherent in the use of a static time period is effectively eliminated, as the timer 419 period will be adjusted to the smallest period necessary to ensure effective power management. For example, a hard disk may be programmed to spin down after 15 seconds of inactivity and the timer programmed to generate timer interrupts every 5 seconds. Using a static time period, if the disk is accessed one millisecond (1 ms) after the timer interrupt, the disk will spin down 20 seconds minus 1 ms after the last access, rather than 15 seconds thereafter, as it is supposed to do. This problem is eliminated by the use of a dynamic time period, as implemented in the alternative embodiment, which is adjusted to compensate for this occurrence.

It is understood that the present invention can take many forms and embodiments. The embodiments shown herein are intended to illustrate rather than to limit the invention, it being appreciated that variations may be made without departing from the spirit or the scope of the invention. For example, the PMU 18 may comprise a conventional "System Management Mode" unit of a microcontroller, as is well known in the art. Alternatively, the PMU 18 may comprise specialized software and hardware for implementing the above-described functions. Moreover, any number of I/O and/or peripheral devices may be power managed using the above-described power management system. Still further, the timer 419 may be implemented using a countup timer, in which case the value of TIMER would be adjusted by adding the value of the lesser of ASV1, ASV2 to TIMER.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A system for reducing an amount of power used by a computer having one or more I/O devices, said system comprising:

means for determining a plurality of power supply modes for each I/O device of said system, said plurality of power supply modes being stored in memory;

means for monitoring the occurrence of activity by said I/O devices at given time periods;

means for selecting from said plurality of power supply modes a power supply mode for each of said I/O devices;

means for altering an amount of power supplied to each of said I/O devices, said altering means comprising means for successively placing said I/O devices in lower power supply modes for the device in response to the lack of activity of said I/O device during successive monitored periods; and means for changing the given time periods during which the occurrence of activity by said I/O devices are monitored in response to the occurrence of activity by said I/O devices.

2. The system of claim 1, wherein said lower power modes include one of a depowered mode, a low voltage mode, and a full power mode.

3. The system of claim 2, wherein said lower power modes comprise said depowered mode and said means for placing comprises:

means for determining whether said device has been accessed in a predetermined amount of time; and means for ultimately reducing a voltage level to said device to zero volts.

4. The system of claim 3, wherein said means for placing further comprises means for updating said memory to reflect said lowest power mode.

5. The system of claim 2, wherein said lowest power mode comprises a low voltage self-refresh mode and said means for placing comprises:

means for reducing a voltage level of said I/O device to a predetermined level; and means for initiating a self-refresh memory to reflect said lowest power mode.

6. The system of claim 2, wherein said lowest power mode comprises said low voltage mode and said means for placing comprises:

means for reducing a voltage level of said device to a predetermined level; and means for updating said memory to reflect said lowest power mode.

7. The system of claim 2, wherein said lowest power mode comprises a self-refresh mode and said means for placing comprises:

means for initiating a self-refresh cycle; and means for updating said memory to reflect said lowest power mode.

8. The system of claim 1, wherein said system has more than one I/O device and each of said more than one I/O device has a plurality of power supply modes associated therewith.

9. The system of claim 1, wherein the memory is programmable.

10. The system of claim 1, wherein for at least one of said I/O devices said plurality of power supply modes comprises more than two power supply modes.

11. A method for reducing an amount of power consumed by a system comprising one or more I/O devices, the method comprising the steps of:

determining a plurality of power supply modes for a device of said system, including a full power supply mode and a plurality of reduced power supply modes;

monitoring activity of said one device during a preselected time period;

upon expiration of said preselected time period, determining whether said one device was active during said preselected time period;

responding to a determination that said one device was not active during said preselected time period, determining whether said one device is already operating in a lowest reduced power supply mode;

responding to a determination that said one device is operating in said lowest reduced supply mode, causing said device to remain in said mode; and responding to a determination that said one device is not operating in said lowest reduced power supply mode, causing said one device to operate in a next lowest reduced power supply mode;

responding to a determination that said one device was active during said preselected time period, causing said one device to operate in a full power supply mode; and altering said preselected time period in response to said device being active.

12. The method of claim 11, wherein said monitoring step further comprises the steps of:

initializing a first state variable to a first state at the beginning of said at least one preselected time period; and upon detection of activity of said one device, setting said first state variable to a second state.

13. The method of claim 12, wherein said determining step comprises the steps of:

detecting a state of said first state variable;

responding to said first state variable state being said first state, determining that said one device was not active during said preselected time period; and responding to said first state variable being said second state, determining that said one device was active during said preselected time period.

14. The method of claim 11 further comprising the steps of:

responding to a determination that said one device was active during said preselected time period, setting a second state variable to an initial value;

responding to a determination that said one device was not active during said preselected time period, determining whether said second state variable is set to a maximum value; and responding to a determination that said second state variable is not set to said maximum value, incrementing said second state variable;

wherein the value of said second state variable is indicative of a current power supply mode of said one device.

15. The method of claim 11 which said altering step further comprises the steps of:

responding to activity of said one device being detected prior to expiration of said preselected time period; and setting said preselected time period equal to an amount of time that had expired prior to said one device activity being detected.

16. The method of claim 11, wherein said step of monitoring activity of said one device comprises monitoring activity of first and second devices, the method further comprising the steps of:

responding to activity of said first device being detected a first amount of time prior to expiration of said preselected time period and activity of said second device being detected a second amount of time prior to expiration of said preselected time period;

determining which of said first and second time amounts is smaller; and setting said preselected time period equal to said smaller of said first and second time amounts.

17. A method of reducing power consumption in a system comprising one or more I/O devices, the method comprising the steps of:

determining a plurality of power consumption modes for each device of said system, including a full power consumption mode and reduced power consumption modes, at least one of said devices having a plurality of power consumption modes;

setting a first state variable to a first state, said first state variable indicating an activity level of each of said devices during a preselected time period;

monitoring said activity level of said devices;

responding to detection of activity of said devices, setting said first state variable to a second state;

generating a preselected time period;

responding to expiration of said preselected time period, determining whether said first state variable is set to said first or second state;

responding to a determination that said first state variable is set to said first state, causing each of said devices to operate in it's next reduced power consumption mode; and responding to a determination that said first state variable is set to said second state, resetting said first state variable to said first state and causing said devices to operate in a full power consumption mode.

18. The method of claim 17, wherein said monitoring is performed continuously throughout operation of said system.

19. The method of claim 17 further comprising:

setting a second state variable to an initial value, said second state variable for indicating a power consumption mode of each of said devices.

20. The method of claim 19 further comprising:

responding to said first state variable being set to said first state, incrementing a value of said second state variable.

21. The method of claim 19 further comprising:

responsive to said first state variable being set to said first state;

determining whether said second state variable value is equal to a maximum value; and responsive to said second state variable value not being equal to said maximum value, incrementing said second state variable.

22. The method of claim 17, wherein said system further comprises an I/O activity interrupt generator electrically connected to at least one I/O device, and said monitoring step comprises receiving interrupts generated by said I/O activity interrupt generator indicative of activity of said at least one I/O device.

23. The method of claim 22 further comprising the step of:

while said first state variable is set to said second state, inhibiting said I/O activity interrupt generator from generating I/O activity interrupts.

24. The method of claim 17, further comprising the steps of:

issuing a timer interrupt upon said expiration of said preselected time period; and subsequent to said issuance of said timer interrupt, restarting the generation of said preselected time period.

25. The method of claim 22 further comprising the steps of:

responding to activity of said one device being detected prior to expiration of said preselected time period; and setting said preselected time period equal to an amount of time that had expired prior to said one device activity being detected.

26. The method of claim 21 further comprising, subsequent to said setting said first state variable to said second state, disabling said detecting until expiration of said preselected time period.

27. The method of claim 21 further comprising, responsive to said determination that said first state variable is set to said first state and prior to said incrementing and causing:

determining whether said second state variable is set to a maximum value; and responsive to a determination that said second state variable is set to said maximum value, inhibiting said incrementing.

28. The method of claim 21, wherein said second value of said first variable indicates a portion of said preselected time period that elapsed prior to activity of said one device being detected, the method further comprising, responsive to expiration of said preselected time period, setting said preselected time period equal to said preselected time period minus said second value of said first state variable.

29. Apparatus for reducing the amount of power consumed by a system comprising one or more I/O devices, the apparatus comprising:

means for determining a plurality of power consumption modes for at least one I/O device of said system, including a full power consumption mode and a plurality of reduced power consumption modes;

an I/O activity interrupt generator electrically connected to at least one I/O device for generating an I/O activity interrupt indicative of activity of said at least one I/O device during a preselected time period; and power management means electrically connected to said I/O device and said I/O activity interrupt generator for determining whether said at least one I/O device was active during said preselected time period;

wherein responsive to a determination that said at least one I/O device was not active during said preselected time period, said power management means causes said power consuming I/O device to operate in successively lower ones of said plurality of power consumption mode;

wherein responsive to a determination that said at least one I/O device was active during said preselected time period, said power management means causes said power consuming I/O device to operate in said full power consumption mode.

30. The apparatus of claim 29 further comprising a timer associated with said I/O device for generating a time interrupt to said power management means upon the expiration of said preselected time period.

31. The apparatus of claim 29 further comprising a first storage device electrically connected to said power management means for indicating detection of activity of said at least one I/O device during said preselected time period.

32. The apparatus of claim 31 further comprising:

a second storage device electrically connected to said power management circuitry for indicating a current power consumption mode of said power consuming I/O device;

wherein responsive to said current power consumption mode indicated by said second storage being a first reduced power consumption mode, said power management circuitry causes said power consuming I/O device to operate in a second further reduced power consumption mode; and wherein responsive to said current power consumption mode indicated by said second storage being said second reduced power consumption mode, said power management circuitry causes said power consuming I/O device to continue operating in said second reduced power consumption mode.

33. The apparatus of claim 29, wherein activity of said at least one I/O device is detected prior to expiration of said preselected time period and wherein said power management means sets said preselected time period equal to an amount of time that had expired prior to detection of said at least one I/O device activity.

34. The apparatus of claim 29, wherein said I/O activity interrupt generator is electrically connected to said power consuming I/O device.

35. The apparatus of claim 29, wherein said I/O activity interrupt generator generates I/O activity interrupts indicative of activity of first and second I/O devices during said preselected time period and wherein activity of said first device is detected a first amount of time prior to expiration of said preselected time period and activity of said second device is detected a second amount of time prior to expiration of said preselected time period, said power management circuitry includes means for determining which of said first and second time amount is smaller and setting said preselected time period equal to said smaller of said first and second time amounts.

* * * * *